United States Patent Office 3,104,257
Patented Sept. 17, 1963

3,104,257
DEHALOGENATION PROCESSES
Samuel Dershowitz, Brookline, Mass., assignor to Polaroid Corporation, Cambridge, Mass., a corporation of Delaware
No Drawing. Filed Dec. 27, 1960, Ser. No. 78,232
5 Claims. (Cl. 260—515)

This invention is concerned with novel reactions of trialkyl phosphites, and more particularly with the dehalogenation of vicinal dihalides with trialkyl phosphites.

A principal object of this invention therefore is to provide a new and useful method of dehalogenating vicinal dihalides.

Other objects of this invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

It has been found that a vicinal dihalide, wherein one or both of the halogens is contiguous to a carbonyl function, is converted to the olefin, smoothly and in good yield, by refluxing with substantially one mole equivalent of a trialkyl phosphite, e.g., trimethyl phosphite. This was unexpected in view of the previous reports that the reaction of vicinal dihalides with trialkyl phosphites proceeded via the normal Arbuzov reaction to yield the corresponding mono and diphosphonates. (See: G. M. Kosolapoff, Organophosphorus Compounds, p. 122; G. Kamai and V. A. Kukhtin, Chem. Abst., vol. 51, p. 119856; A. N. Pudovik and M. G. Imaev, Chem. Abst., vol. 47, p. 10463e.) The formation of an olefin as the major product has been reported only in cases involving polyhalogenated compounds. (See: G. Kamai, Chem. Abst., vol. 47, p. 10461a; H. R. Davis, U.S. Patent No. 2,742,510.)

The following specific examples are given by way of illustration only, the invention not being limited to the specific ingredients, time of treatment and other operating conditions recited therein.

*Example 1*

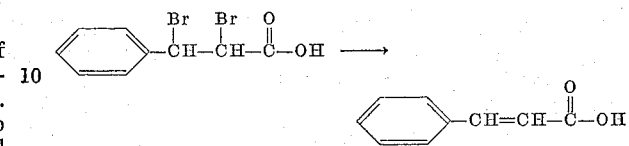

20 g. of trans-dibenzoylethylene dibromide and 5.5 ml. of trimethyl phosphite were dissolved in 150 ml. of dry toluene and the solution was refluxed for 20 hours. The solvent was removed and the residue crystallized from ethanol. 10.7 g. (92% yield) of transdibenzoylethylene metling at 108–110° C. was obtained. The melting point of an authentic sample of trans-dibenzoylethylene was not depressed when mixed with the product.

*Example 2*

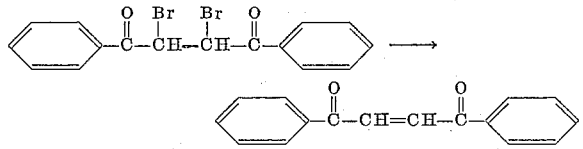

5.0 g. of chalcone dibromide and 1.9 ml. of trimethyl phosphite were dissolved in 75 ml. of dry toluene and the solution was refluxed for 2 hours. The solvent was removed and the residue was crystallized from ethanol. The resulting chalcone (2.3 g., 80% yield, M.P. 55–56° C.) did not depress the melting point of an authentic sample of chalcone.

*Example 3*

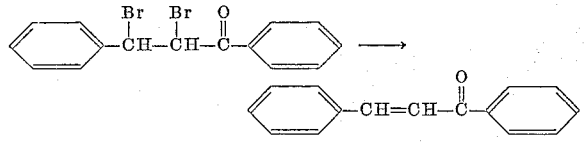

10.0 g. of cinnamic acid dibromide and 4.5 ml. of trimethyl phosphite were dissolved in 150 ml. of dry toluene and the solution was refluxed for 20 hours. The reaction mixture was worked up as in Examples 1 and 2 to yield 4.4 g. (92%) of cinnamic acid.

The significance of the molar ratio of the trialkyl phosphite and the vicinal dihalide is illustrated by the following example.

*Example 4*

When Example 1 was repeated using 10 g. of trans-benzoylethylene dibromide and 7.0 ml. (2 mol. eq.) of trimethyl phosphite with refluxing for 20 hours, 7.5 g. (65% yield) of the diphosphonate was obtained having an M.P. of 131—134° C. Three recrystallizations from benzene-hexane yielded a product melting at 134–135° C. which analyzed as follows:

|  | C | H | P |
|---|---|---|---|
| Calculated for $C_{20}H_{24}O_8P_2$ | 52.9 | 5.3 | 13.6 |
| Found | 53.2 | 5.6 | 13.9 |

Attempts to debrominate trans-dibenzoylethylene dibromide by customary methods were unsatisfactory, leading to (a) reduction of the double bond when zinc was employed and (b) tars when sodium iodide was used.

Since certain changes may be made in the above process without departing from the scope of the invention herein involved, it is intended that all matter contained in the above description shall be interpreted as illustrative and not in a limiting sense.

What is claimed is:

1. The process of debrominating a compound selected from the group consisting of dibenzoylethylene dibromide, chalcone dibromide and cinnamic acid dibromide comprising refluxing said compound with a substantially equimolar amount of a trialkyl phosphite.

2. The process of debrominating a compound selected from the group consisting of dibenzoylethylene dibromide, chalcone dibromide and cinnamic acid dibromide comprising refluxing said compound with a substantially equimolar amount of a trialkyl phosphite dissolved in dry toluene.

3. The process of debrominating dibenzoylethylene dibromide by refluxing it with a substantially equimolar amount of trimethyl phosphite.

4. The process of debrominating chalcone dibromide by refluxing it with a substantially equimolar amount of trimethyl phosphite.

5. The process of debrominating cinnamic acid dibromide by refluxing it with a substantially equimolar amount of trimethyl phosphite.

References Cited in the file of this patent

Kosolapoff: "Organophosphorus Compounds," J. Wiley & Sons, pages 122 and 197, 1951.

Arbuzov et al.: "Chemical Abstracts," vol. 49, 13940–13941, 1955.